J. B. SMITH.
TOBACCO CURING APPARATUS.

No. 177,761. Patented May 23, 1876.

WITNESSES:
F. McArdle.
John Goethals

INVENTOR:
J. B. Smith
BY
Munn & Co.
ATTORNEYS.

UNITED STATES PATENT OFFICE.

JOHN B. SMITH, OF MILTON, NORTH CAROLINA.

IMPROVEMENT IN TOBACCO-CURING APPARATUS.

Specification forming part of Letters Patent No. 177,761, dated May 23, 1876; application filed January 29, 1876.

*To all whom it may concern:*

Be it known that I, JOHN B. SMITH, of Milton, Caswell county, North Carolina, have invented a new and Improved Tobacco-Curing Apparatus, of which the following is a specification:

The invention consists in a certain combination of means by which tobacco may be thoroughly and economically cured, the same being hereinafter described, and pointed out in the claim.

Figure 1:
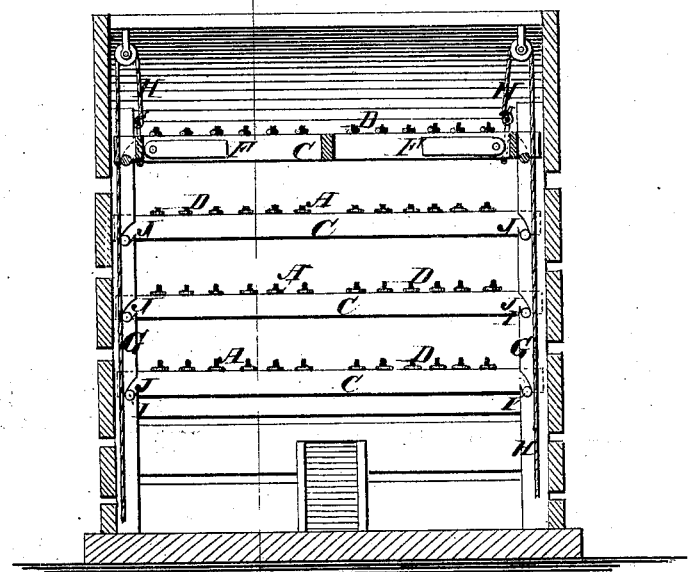
Figure 2:
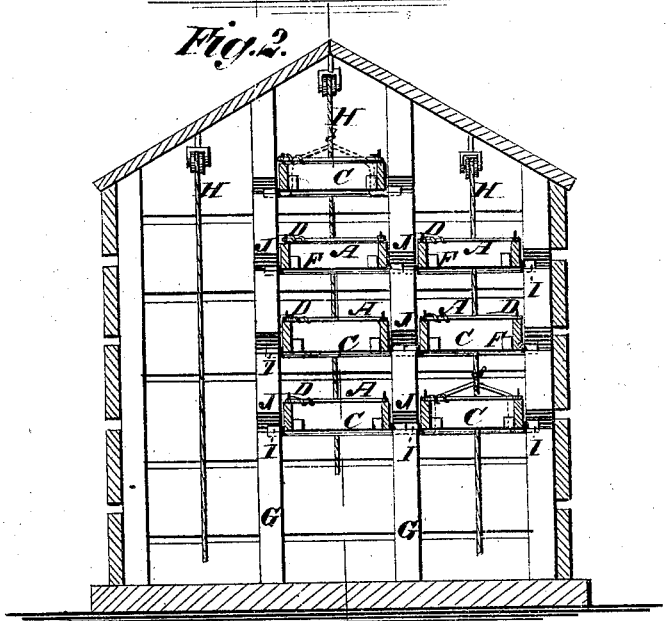
Figure 3:
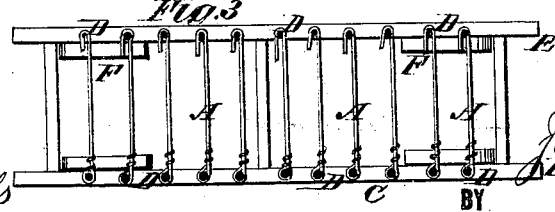

Figure 1 is a sectional elevation of a tobacco-curing barn contrived according to my invention. Fig. 2 is a sectional elevation, and Fig. 3 is a plan view, of one of the frames.

Similar letters of reference indicate corresponding parts.

A represents wires, on which I string the tobacco-leaves, which I pass through the stems as I gather the leaves, said wires being coiled at one end, to connect with the pegs of the frames C, and straight at the other end, for passing through the leaf-stems, but, when full, are bent around the nails of the frames C, as represented at D, to secure the wires in position. The frames C have handles E and short legs F, by which to carry them about the field and rest them on the ground while loading them with tobacco.

The frames, when loaded, are placed with their ends between the guide-studs G of the curing-house, and hoisted up to the position where they are to rest for drying by suitable tackle H, and are secured by cross-pieces I, let into notches J under the frames. When sufficiently dried, the frames are let down and the leaves stripped off from the wires, which are first straightened for that purpose, and packed in boxes or other packages.

The essential object of this invention is to contrive a plan by which the leaves can be suspended independently of each other, and thus be exposed alike in all parts to the curing medium, by which the effect and color are more uniform.

Having thus described my invention, I claim as new and desire to secure by Letters Patent—

The combination of frames C, provided with the pins and wires and the tackle H, all substantially as and for the purpose specified.

JOHN B. SMITH.

Witnesses:
  A. L. SMITH,
  T. W. LONG.